US008567611B2

(12) United States Patent
Cheng et al.

(10) Patent No.: US 8,567,611 B2
(45) Date of Patent: Oct. 29, 2013

(54) FILTRATION MATERIAL

(75) Inventors: Shu-Hui Cheng, Hsinchu County (TW); Jong-Pyng Chen, Hsinchu (TW); En Kuang Wang, Hsinchu (TW); Yi-Chun Lo, Hsinchu County (TW); Shan-Shan Lin, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 415 days.

(21) Appl. No.: 12/975,349

(22) Filed: Dec. 21, 2010

(65) Prior Publication Data

US 2011/0210064 A1    Sep. 1, 2011

Related U.S. Application Data

(63) Continuation-in-part of application No. 12/714,525, filed on Feb. 28, 2010, now Pat. No. 8,281,938.

(30) Foreign Application Priority Data

Sep. 2, 2010    (TW) ................................ 99129629 A

(51) Int. Cl.
*B01D 39/00* (2006.01)
*B01D 39/14* (2006.01)
*D04H 1/00* (2006.01)

(52) U.S. Cl.
USPC ............... 210/490; 210/500.34; 210/500.42; 210/500.37; 210/508; 442/351

(58) Field of Classification Search
USPC .......... 210/490, 650, 500.27, 500.38, 500.23, 210/500.28, 504, 506, 508, 500.34, 500.37; 442/351, 400, 401; 977/902, 700; 428/361; 264/464, 484
See application file for complete search history.

(56) References Cited

U.S. PATENT DOCUMENTS

| | | | | |
|---|---|---|---|---|
| 4,026,439 A * | 5/1977 | Cocks | ............................ | 222/49 |
| 4,295,952 A * | 10/1981 | de Nora et al. | ............... | 204/252 |
| 4,704,324 A | 11/1987 | Davis et al. | | |
| 4,758,342 A * | 7/1988 | Heckmann et al. | ........... | 210/490 |
| 4,765,897 A | 8/1988 | Cadotte et al. | | |
| 4,769,148 A | 9/1988 | Fibiger et al. | | |
| 4,812,238 A | 3/1989 | Cadotte et al. | | |
| 4,828,700 A | 5/1989 | Fibiger et al. | | |
| 4,857,493 A | 8/1989 | Ford et al. | | |
| 4,927,540 A | 5/1990 | Wessling et al. | | |
| 4,948,711 A * | 8/1990 | Kojima et al. | ................ | 430/393 |
| 5,084,173 A | 1/1992 | Nitadori et al. | | |
| 5,464,538 A | 11/1995 | Schmidt et al. | | |
| 5,543,045 A * | 8/1996 | Fukutomi et al. | ............ | 210/490 |
| 5,755,540 A * | 5/1998 | Bushnell | ....................... | 410/29.1 |
| 5,755,964 A | 5/1998 | Mickols | | |
| 6,348,157 B1 * | 2/2002 | Ohmi et al. | ................... | 210/760 |
| 6,562,266 B2 | 5/2003 | Mickols | | |
| 7,368,534 B2 * | 5/2008 | Bass et al. | ..................... | 530/350 |
| 7,670,470 B2 * | 3/2010 | Mao et al. | ..................... | 204/400 |
| 8,137,562 B2 * | 3/2012 | Thomas | ........................ | 210/645 |
| 8,182,695 B2 * | 5/2012 | Whiteford et al. | ........... | 210/654 |
| 2004/0050791 A1 * | 3/2004 | Herczeg | ....................... | 210/651 |
| 2004/0241436 A1 * | 12/2004 | Hsieh et al. | ................... | 428/361 |
| 2005/0218069 A1 * | 10/2005 | Lee et al. | ................. | 210/500.42 |
| 2006/0041077 A1 * | 2/2006 | Kriesel et al. | .............. | 525/327.4 |
| 2006/0094320 A1 * | 5/2006 | Chen et al. | .................... | 442/340 |
| 2007/0205155 A1 * | 9/2007 | Babcock et al. | ............. | 210/644 |
| 2008/0149561 A1 * | 6/2008 | Chu et al. | ................. | 210/500.38 |
| 2009/0032475 A1 * | 2/2009 | Ferrer et al. | ................... | 210/799 |
| 2010/0044289 A1 * | 2/2010 | Koslow | ..................... | 210/167.02 |
| 2011/0198282 A1 * | 8/2011 | Chu et al. | ................. | 210/500.29 |
| 2011/0210064 A1 * | 9/2011 | Cheng et al. | ............. | 210/500.29 |
| 2012/0091072 A1 * | 4/2012 | Kozlov et al. | ................. | 210/767 |
| 2012/0125866 A1 * | 5/2012 | Fantini | ......................... | 210/767 |
| 2012/0137885 A1 * | 6/2012 | Dullaert et al. | ................... | 96/12 |

FOREIGN PATENT DOCUMENTS

| | | |
|---|---|---|
| CN | 1583233 A | 2/2005 |
| CN | 101039744 A | 9/2007 |
| EP | 0798791 A2 | 10/1997 |
| EP | 0999238 A1 | 5/2000 |
| WO | 2006015495 A1 | 2/2006 |

OTHER PUBLICATIONS

Ritcharoen et al., "Development of polyelectrolyte multilayer-coated electrospun cellulose acetate fiber mat as composite membranes", European Polymer Journal 44 (2008) 3963-3968.
Notification of examination opinion issued by the Taiwan Intellectual Property Office on Nov. 29, 2012, for the above-referenced application's counterpart application in Taiwan (Application No. 098106638).
Notification of first examination opinion issued by the China Intellectual Property Office on Apr. 25, 2013, for the above-referenced application's counterpart application in China (Application No. 201010272136.X).
Notification of examination opinion issued by the Taiwan Intellectual Property Office on Mar. 20, 2013, for the above-referenced application's counterpart application in Taiwan (Application No. 099129629).
International Search Report under PCT (Patent Cooperation Treaty) issued by the International Search Authority (China's State Intellectual Property Office) on Nov. 3, 2011, for the above-referenced application's counterpart International Application under PCT (Application No. PCT/CN2011/077655).

* cited by examiner

*Primary Examiner* — Ana Fortuna
(74) *Attorney, Agent, or Firm* — Pai Patent & Trademark Law Firm; Chao-Chang David Pai

(57) ABSTRACT

The invention discloses a filtration material for desalination, including a support layer, and a desalination layer formed on the support layer, wherein the desalination layer is a fiber composite membrane and includes at least one water-swellable polymer. The water-swellable polymer is made of hydrophilic monomers and hydrophobic monomers, and the hydrophilic monomers include ionic monomers and non-ionic monomers, and the ionic monomers include cationic monomers and anionic monomers.

13 Claims, No Drawings

FILTRATION MATERIAL

CROSS REFERENCE TO RELATED APPLICATIONS

This application is a Continuation-In-Part of pending U.S. patent application Ser. No. 12/714,525 filed Feb. 28, 2010 and entitled "Nano-fiber material and salt rejection filtration material".

This Application claims priority of Taiwan Patent Application No. 99129629, filed on Sep. 2, 2010, the entirety of which is incorporated by reference herein.

BACKGROUND OF THE INVENTION

1. Field of the Invention

The present invention relates to a filtration material for desalination, and in particular relates to a filtration material made of a water-swellable polymer.

2. Description of the Related Art

Currently, filtration materials for desalination which are applied to sea water, industrial water and wastewater, have been developed by various sources all around the world. Conventionally, design issues concern the efficient treatment of salt water, the reduction of operating pressure, low energy consumption, and reduction in the cost of water treatment.

U.S. Pat. No. 4,828,700 discloses a membrane made of cross-linked poly methyl methacrylate. The membrane performance has a 9.1 GFD flux, and a 97.9% salt rejection, when tested under an operation pressure of 400 psi using 2500 ppm of salt water.

U.S. Pat. No. 5,755,964 discloses a reverse osmosis (RO) membrane, wherein the RO membrane has good wetting property by using an amine compound to treat the surface of the RO membrane. The RO membrane performance has a 48 GFD flux, when tested under an operation pressure of 225 psi using 2000 ppm of salt water. The RO membrane exhibits high flux like nanofiltration material.

The filtration materials for desalination in prior art are made of nanoporous polymeric thin film. However, the nanoporous polymeric thin film must be operated under a high pressure. Alternatively, if the filtration materials are made of hydrophilic materials, the operation pressure may be decreased, which would thereby improve desalination efficiency.

BRIEF SUMMARY OF THE INVENTION

The present invention provides a filtration material for desalination, comprising: a support layer, and a desalination layer formed on the support layer, wherein the desalination layer is a fiber composite membrane and comprises at least one water-swellable polymer.

A detailed description is given in the following embodiments with reference to the accompanying drawings.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a filtration material for desalination, which comprises a support layer and a desalination layer formed on the support layer. The support layer is used to support the desalination layer. The desalination layer is a fiber composite membrane and comprises at least one water-swellable polymer. The term "water-swellable polymer" means that the polymer can swell itself by absorbing water. Although the polymer absorbs a lot of water, the structure of the polymer is not deformed. In some cases, the water-swellable polymer is not a water soluble polymer and is made of hydrophilic monomers and hydrophobic monomers. Alternatively, the water-swellable polymer is a water soluble polymer, and it maintains the swellable property and reduces the hydrolysis property by an appropriate cross-linking reaction.

The support layer comprises one or more porous materials, wherein the porous materials comprise cellouse ester, polysulfone, polyacrylonitrile (PAN), polyvinglidene fluoride (PVDF), polyetheretherketone (PEK), polyester (PET), polyimide (PI), chlorinated polyvinyl chloride (PVC) or styrene acrylnitrile (SAN). The support layer may be self-made or commercially available and may be in the form of non-woven, woven or open pores.

In one embodiment, the filtration material for desalination comprises two support layers in which a bottom layer is polyester (PET), and an upper layer is polyacrylonitrile (PAN) or polysulfone. The two support layers may be in the form of a non-woven or woven layer, and preferably non-woven layer.

The hydrophilic monomers of the water-swellable polymer comprise ionic monomers and non-ionic monomers.

The ionic monomers comprise cationic monomers and anionic monomers. The cationic monomers comprise acryloxyethyltrimethyl ammonium chloride, acryloxyethyltrimethyl benzyl ammonium chloride, methacryloxyethyltrimethyl ammonium chloride, methacryloxyethyltrimethyl p-toluenesulfonate, methacryloyloxyethyl dimethylbenzyl ammonium chloride, dimethylaminoethyl acrylate, t-butylaminoethyl methacrylate, vinyl imidazole or vinyl pyridine.

The anionic monomers comprise acrylic acid, methacrylic acid, itaconic acid, beta-carboxyethyl acrylate, maleic anhydride or sodium salt thereof. The examples of the anionic monomers are sodium acrylate, sodium 1-allyloxy-2hydroxypropane sulfonate, ammonium allylpolyethoxy sulfate, sodium styrene sulfonate or 2-acrylamido-2-methyl propane sulfonic acid.

The non-ionic monomers comprise hydroxyethyl methacrylate, hydroxyethyl acrylate, hydroxypropyl acrylate, acrylamide, N-hydroxyethyl acrylamide or polyvinylpyrolidone.

The hydrophobic monomers comprise methyl acrylate, ethyl acrylate, butyl acrylate, 2-ethylhexyl acrylate, methyl methacrylate, t-butyl methacrylate, styrene or vinylidine fluoride. Additionally, although the monomers of acrylonitrile and methacrylonitrile are water soluble, the polymer made of these monomers are also used as the hydrophobic monomers.

In order to improve the mechanic strength of the fiber composite membrane, the water-swellable polymer further reacts with a cross-linking agent to conduct a cross-linking reaction. The cross-linking agent may cross-linked to the hydrophilic or hydrophobic groups of the water-swellable polymer (preferably to react with the hydrophilic groups) to reduce the solubility of the water-swellable polymer. The cross-linking agent comprises acid anhydride, epoxy, isocyanate, aminoplast resins (the product of formaldehyde reacting with melamine, urea or guanamine), alkoxymethyl acrylamide, carbodiimide, aziridine or derivatives thereof.

In one embodiment, the acid anhydride is cross-linked to a hydroxyl group of the water-swellable polymer. In another embodiment, the epoxy is cross-linked to a carboxyl group, a hydroxyl group, or an amine group of the water-swellable polymer. In yet another embodiment, the isocyanate is cross-linked to a hydroxyl group of the water-swellable polymer. In another embodiment, the aminoplast resins are cross-linked to a hydroxyl group, a carboxyl group or an amide group of the water-swellable polymer. In one embodiment, the alkoxymethyl acrylamide is cross-linked to a hydroxyl group of the water-swellable polymer. In yet another embodiment, the carbodiimide or aziridine is cross-linked to a carboxyl group of the water-swellable polymer.

In addition to the chemical cross-linking reaction, the cross-linking reaction further comprises an ionic cross-linking reaction. For example, a multi-chlorinated hydrocarbon is cross-linked to an amine group of the water-swellable polymer to form a quaternary ammonium salt. In one embodiment, 1,6-dichlorohexane is cross-linked to an amine group of the water-swellable polymer to form a quaternary ammonium salt to complete a quaternization reaction for ionic crosslinking.

Furthermore, the hydrophilic group of the water-swellable polymer may react with crosslinkable monomers, such as N-isobutoxymethyl acrylamide.

Moreover, the water-swellable polymer may be made of a modified polymer, such as polyvinyl alcohol, carboxymethyl cellulose or hydroxyethyl cellulose. The polyvinyl alcohol is the hydrolysis product of the polyvincylacetate, and the hydroxyethyl cellulose is an addition reaction product by reacting ethylene oxide with cellulose.

Additionally, the fiber composite membrane is in the form of a fiber with a bonder, and the fiber is made from water-swellable polymer by spinning techniques, such as solution spinning or electrospinning. Then, the binder is filled in the fiber by coating or dipping. Finally, after a roller or plate process, a dense fiber composite membrane is obtained.

The binder may be a water-swellable polymer or other polymers, other polymers are such as polyvinyl alcohol (PVA), polystyrene (PS), polyacrylamides, polymethacrylamides, polymethacrylates, polyacrylates, polyester, hydroxyethyl cellulosic or hydroxypropyl cellulose.

The function of the binder is to improve the mechanic strength of the filter materials and narrow the holes in the surface of desalination layer.

In order to reduce solubility of the fiber composite membrane and enhance the mechanical strength of fiber composite membrane, an additional cross-linking agent is added into the binder. For example, methylated melamine-formaldehyde resin (such as hexamethoxymethylmelamine) is added into the binder, and it is cross-linked to a hydroxyl group of the fiber composite membrane to change the solubility of the fiber composite membrane.

In one embodiment, the fiber is made from the water-swellable polymer by electrospinning. Then, the binder of polyacrylonitrile (PAN) is added into the fiber to form the fiber composite membrane.

In another embodiment, the fiber is made from polyacrylonitrile (PAN) by electrospinning. Then, the binder of water-swellable polymer is added into the fiber to form the fiber composite membrane.

In a preferably embodiment, the fiber is made from the water-swellable polymer by electrospinning. Then, the binder of water-swellable polymer is added into the fiber to form the fiber composite membrane.

The fiber of the fiber composite membrane of the invention comprises a microfiber or nanofiber, wherein the microfiber has a diameter of about 1-30 μm, preferably 1-15 μm, and the nanofiber has a diameter of about 10-1000 nm, preferably 50-500 nm.

The conventional reverse osmosis (RO) membranes have smaller pores (smaller than 1 nm). Thus, the membranes must be operated under a pressure which is larger than about 500 psi, even 1000 psi. The main advantage of the invention is that the filtration material of the invention can exhibit high flux as with the conventional RO membrane, but may be operated under a lower pressure environment. Flux of the filtration material of the invention is 18 $L/m^2/hr$, and salt rejection is 60%-90%, when tested under an operation pressure smaller than 10 psi.

Compared with prior art, the open pores of the fiber composite membrane of the invention may be used as an effective desalination membrane, thus the filtration material of the invention may be operated under a lower pressure environment. Note that the filtration material of the invention is only made by one support layer with one desalination layer for desalination effect. The filtration material may be additionally combined with other conventional permeable, semi-permeable membranes or other polymer films according to actual application.

Because the fiber composite membrane has the porous properties, the filtration material of the invention has a desalination effect, and the filtration material still has high flux even if operated under lower pressure. The filtration material of the invention may be used in a desalination process, wastewater treatment, ultrapure water treatment, water softening or heavy metals recovery.

EXAMPLE

Comparative Example 1

The filtration material of Comparative Example 1 is made by two support layers. A bottom layer is polyester (PET) non-woven (purchased from HO YU TEXTILE CO., LTD) and an upper layer is polyacrylonitrile (PAN) (purchased from TONGHWA synthetic fiber CO. Ltd., molar weight of about 150,000~300,000).

Comparative Example 2

The support layer of Comparative Example 1 was used as the support layer of Example 2.

The desalination layer of Comparative Example 2 was fabricated as following. 30 g of polyacrylonitrile (PAN) was dissolved in 200 g of N,N-dimethyl-acetamide (DMAc) to provide a spinning solution. The nanofiber material was obtained by electrospinning with an applied voltage of 39 KV, spray amount of 1000 μL/min, a 25 cm distance between the collector and spinneret, and air pressure of 2.8 $kg/cm^3$. A nanofiber material with a diameter of 280 nm-380 nm and weight of 30-60 $g/m^2$ was obtained.

3 g of polystyrene (PS) (purchased from Aldrich, used as binder) was dissolved in 27 g p-xylene to form a mixture. Next, the mixture was coated on the above nanofiber material at 70° C. for 1 hours to form the fiber composite membrane.

Example 1

Fabrication of the Water-Swellable Polymer 10 g of sodium styrenesulfate, 40 g of 4-vinyl pyridine, 7 g of styrene, 50 g of deionized water and 50 g of isopropanol (IPA) were dissolved in a reaction flask, and stirred under $N_2$ atmosphere at 70° C. A solution containing 0.2 g of potassium persulfate (KPS) in 10 mL of deionized water was slowly added into the reaction flask, and kept for 3 hours. The mixture was purified to obtain 50.1 g of the water-swellable polymer (88%).

Example 2

Fabrication of Nanofiber Materials 36 g of the polymer of Example 1 was dissolved in 200 g of N,N-dimethyl-acetamide (DMAc) to provide a spinning solution. The nanofiber material was obtained by electrospinning with an applied voltage of 39 KV, spray amount of 1200 μL/min, a 20 cm distance between the collector and spinneret, and air pressure of 5 kg/cm$^3$. A nanofiber material with a diameter of 70 nm-120 nm and weight of 60-94 g/m$^2$ was obtained.

Example 3

Fabrication of Nanofiber Composite Materials 30 g of polyacrylonitrile (PAN) was dissolved in 200 g of N,N-dimethyl-acetamide (DMAc) to provide a spinning solution. The nanofiber material was obtained by electrospinning with an applied voltage of 39 KV, spray amount of 1000 μL/min, a 25 cm distance between the collector and spinneret, and air pressure of 2.8 kg/cm$^3$. A nanofiber material with a diameter of 280 nm-380 nm and weight of 30-60 g/m$^2$ was obtained.

Example 4

The support layer of Comparative Example 1 was used as the support layer of Example 4.

The desalination layer of Example 4 was fabricated as following. 3 g of Example 1 (used as binder) was dissolved in 27 g alcohol, and then 2.6 g of 1,6-dichlorohexane (used as cross-linking agent) was added into the alcohol to form a mixture. Next, the mixture was coated on the nanofiber material of Example 2 at 70° C. for 4 hours to form the fiber composite membrane.

Example 5

The support layer of Comparative Example 1 was used as the support layer of Example 5.

The desalination layer of Example 5 was fabricated as following. 0.6 g of Example 1 (used as binder) was dissolved in 29.4 g alcohol, and then 0.42 g of 1,6-dichlorohexane (used as cross-linking agent) was added into the alcohol to form a mixture. Next, the mixture was coated on the nanofiber material of Example 3 at 70° C. for 4 hours to form the fiber composite membrane.

Example 6

The support layer of Comparative Example 1 was used as the support layer of Example 6.

The desalination layer of Example 6 was fabricated as following. 3 g of commercially available polystyrene (PS) (used as binder) was dissolved in 27 g p-xylene to form a mixture. Next, the mixture was coated on the nanofiber material of Example 2 at 70° C. for 1 hour to form the fiber composite membrane.

Example 7

The support layer of Comparative Example 1 was used as the support layer of Example 7.

The desalination layer of Example 7 was fabricated as following. 3 g of Example 1 (used as binder) was dissolved in 27 g alcohol, and then 2.1 g of 1,6-dichlorohexane (used as cross-linking agent) was added into the alcohol to form a mixture. Next, the mixture was coated on the commercial available polypropylene (PP) nanofiber material at 70° C. for 4 hours to form the fiber composite membrane.

Example 8

The support layer of Comparative Example 1 was used as the support layer of Example 8.

The desalination layer of Example 8 was fabricated as following. 10 g of polyvinyl alcohol (PVA) (purchased from ChangChun Group) (used as binder) was dissolved in 90 g water, and then 0.01 g of maleic anhydride (MA) (used as cross-linking agent) was added into the water to form a mixture. Next, the mixture was coated on the nanofiber material of Example 3 at 70° C. for 4 hours to form the fiber composite membrane.

The desalination efficiency of Comparative Example 1-2 and Example 4-8 are shown in Table 1. As shown in Table 1, the filtration material made by the water-swellable polymer of the invention had a good desalination effect, with desalination efficiency of about 50-95%.

TABLE 1

| Example | fiber | binder | Desalination efficiency (%) |
|---|---|---|---|
| Comparative Example 1 | none (only support layer) | | 0% |
| Comparative Example 1 | PAN (commercial available) | PS (commercial available) | 54.63% |
| Example 4 | The polymer of Example 1 | The polymer of Example 1 | 96.7% |
| Example 5 | PAN (commercial available) | The polymer of Example 1 | 87.58% |
| Example 6 | The polymer of Example 1 | PS (commercial available) | 82.50% |
| Example 7 | PP (commercial available) | The polymer of Example 1 | 64.28% |
| Example 8 | PAN (commercial available) | PVA (commercial available) | 65.04% |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A filtration material, comprising:
   a support layer; and
   a desalination layer formed on the support layer, wherein the desalination layer is a fiber composite membrane and comprises at least one water-swellable polymer copolymerized of styrene sulfate, 4-vinyl pyridine, and styrene.
2. The filtration material as claimed in claim 1, wherein the support layer comprises one or more porous materials.
3. The filtration material as claimed in claim 2, wherein the porous materials comprise cellouse ester, polysulfone, polyacrylonitrile (PAN), polyvinglidene fluoride (PVDF), polyetheretherketone (PEEK), polyester (PET), polyimide (PI), chlorinated polyvinyl chloride (PVC) or styrene acrylnitrile (SAN).

4. The filtration material as claimed in claim 1, wherein the fiber composite membrane is in the form of a fiber with a binder, and the fiber comprises microfiber or nanofiber.

5. The filtration material as claimed in claim 1, wherein the water-swellable polymer reacts with a cross-linking agent to conduct a cross-linking reaction.

6. The filtration material as claimed in claim 5, wherein the cross-linking agent comprises acid anhydride, epoxy, isocyanate, aminoplast resins, alkoxymethyl acrylamide, carbodiimide, aziridine or derivatives thereof.

7. The filtration material as claimed in claim 6, wherein the cross-linking agent comprises epoxy and the epoxy is cross-linked to a hydroxyl group or an amine group of the water-swellable polymer.

8. The filtration material as claimed in claim 6, wherein the cross-linking agent comprises isocyanate and the isocyanate is cross-linked to a hydroxyl group of the water-swellable polymer.

9. The filtration material as claimed in claim 6, wherein the cross-linking agent comprises aminoplast resins and the aminoplast resins are cross-linked to a hydroxyl group of the water-swellable polymer.

10. The filtration material as claimed in claim 6, wherein the cross-linking agent comprises acid anhydride and the acid anhydride is cross-linked to a hydroxyl group of the water-swellable polymer.

11. The filtration material as claimed in claim 6, wherein the cross-linking agent comprises alkoxymethyl acrylamide and the alkoxymethyl acrylamide is cross-linked to a hydroxyl group of the water-swellable polymer.

12. The filtration material as claimed in claim 5, wherein the cross-linking reaction comprises an ionic cross-linking reaction.

13. The filtration material as claimed in claim 5, wherein a multi-chlorinated hydrocarbon is cross-linked to an amine group of the water-swellable polymer to form a quaternary ammonium salt.

* * * * *